Figure 1:
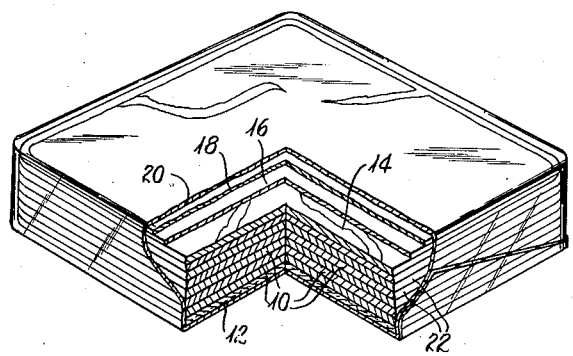

Sept. 22, 1959   H. W. BARNETT ET AL   2,905,561
PREVENTION OF FADING OF COLOR OF CURED MEAT PRODUCTS
Filed April 25, 1958

INVENTORS
Hugh W. Barnett
Carrol H. Perrin
BY
Bacon & Thomas
ATTORNEYS

United States Patent Office 2,905,561
Patented Sept. 22, 1959

2,905,561

PREVENTION OF FADING OF COLOR OF CURED MEAT PRODUCTS

Hugh W. Barnett, Clarkson, and Carrol H. Perrin, Toronto, Ontario, Canada, assignors to Canada Packers Limited, Toronto, Ontario, Canada Application April 25, 1958, Serial No. 732,766

13 Claims. (Cl. 99—174)

This invention relates to the treatment of meats and meat products, and in particular to the treatment of fresh-cut surfaces of cured meats or cured meat products for the prevention of fading of color on such surfaces. The invention also relates to improved methods of preparing cured meats and cured meat products for market display and for packaging such meats and meat products, whereby a cut surface of such meat or meat product may be viewed by the purchaser, and such surface will remain attractive and retain its original color for a relatively long period of time. The invention further embraces within its scope an improved meat package including at least one cut meat surface visible through transparent coverings.

The typical red or pink color of the fresh-cut surface of cured meat is due to the presence of nitric oxide myoglobin and nitric oxide hemoglobin, or, in the case of cured meat which has been subjected to heat treatment, is due to the presence of nitrosomyochromogen and nitrosohemochromogen. During the curing operation, nitric oxide produced by the breakdown of nitrates or nitrites— one or both of which are present in all known curing mixtures—combines with the myoglobin or hemoglobin present in the fresh meat to form nitric oxide myoglobin or nitric oxide hemoglobin. On heating, as in a cooking or smoking step, these compounds are converted to nitrosomyochromogen and nitrosohemochromogen respectively, which are the pigments in a final smoked or cooked cured meat product. These pigments unfortunately are relatively unstable, and when exposed to air and light, oxidize in the case of nitric oxide myoglobin and nitric oxide hemoglobin to metmyoglobin and methemoglobin, and in the case of nitrosomyochromogen and nitrosohemochromogen to metmyochromogen and methemochromogen, all of which are brown or gray in color. Since the oxygen tension within the meat is zero, there is little or no problem of conversion of the red pigments to undesirable brown or gray colors in the interior of a piece of cured meat. However, when cured meat pieces are cut or sliced, and the cut or sliced surfaces are exposed to light or air for display or other purposes, the initially bright and attractive pink color rapidly disappears, and the cut surface becomes dull gray or brown in color and generally unappetizing in appearance. Drying out of the exposed meat surface and shrinkage of the product are also serious marketing problems.

This characteristic of cured meats represents a very serious economic loss to the meat industry. If the product is not sold within a relatively short time after being cut or sliced, and being placed on display, the top slice or top surface must often be discarded because of its faded or dried appearance. In the case of prepackaged sliced cured meats where the exposed slice cannot be readily removed, the whole package must be rejected or repackaged. In recent years, with a tendency toward milder cures, reduced cure times, reduced heat treatments, increased intensity of display lighting, and especially the increased emphasis on preslicing and prepackaging, the problem of loss or change in color of cured meat on exposure to air and light has become greatly accentuated.

Various methods have been adopted by the meat packing industry to prevent or reduce the fading of cured meats. The use of opaque packaging materials by excluding light greatly retards fading. Cured meat, however, is sold very largely on the basis of eye appeal, and it has been found that sales are reduced considerably when this type of packaging is employed.

A more generally adopted method, particularly for sliced prepackaged cured meats, is to mount the slices on an opaque material, such as cardboard, then overwrap the whole with a transparent film. A lithographed label may then be attached to the package over the outside surface of the film-covered cardboard. The packages are stacked label side up in the display counters, so the purchaser may examine the product by simply inverting the package. The meat color is protected from fading as long as the opaque side of the package, rather than the transparent side, is exposed. In practice, it has been found very difficult to maintain this condition, since the packages are subject to considerable handling by the purchaser who, more often than not, returns the package to the counter with the transparent side up.

Another method, also in quite general use, is to package the cured meat in a non-oxygen-permeable transparent bag or pouch, which is then sealed after the air has been evacuated as completely as possible. This method is effective only provided adequate vacuum can be obtained and maintained.

There have been numerous proposals for the use of chemical additives or preservatives in the treatment of meats to enhance or preserve the color thereof. For example, it has been proposed to add ascorbic acid to the curing mixture whereby such ascorbic acid accelerates the rate of curing by more rapidly reducing the sodium nitrite to nitric oxide, and by converting metmyoglobin back to myoglobin, which can thereby react with the nitric oxide and form nitrosomyoglobin. It has been advanced that ascorbic acid or sodium ascorbate added in this manner will prevent subsequent fading of cured meat color due to residual anti-oxidant effect. In practice, however, this is true to only a relatively minor extent. The amount of ascorbic acid which may be economically added to a curing mixture is very small, and since the ascorbic acid is a relatively unstable compound, most of it is lost during the curing and processing operations.

It has also been proposed to apply ascorbic acid or sodium ascorbate solutions in relatively high concentrations to cut surfaces of meat.

While some preservation of the original color of the cured meat can be obtained by addition of ascorbic acid to the fresh-cut surface, only partial protection from fading is obtained, since the ascorbic acid tends to diffuse or migrate into the meat rather than remaining on the surface where it is required. Further, since ordinary packaging films are permeable to air, the ascorbic acid itself becomes oxidized relatively rapidly, and its effectiveness is then lost.

Accordingly, an object of the present invention is to provide an improved method for the prevention of fading of cured meat color.

Another object of the invention is to provide a method for preserving the original red or pink color of the fresh-cut surface of a cured meat product.

Another object of the invention is to provide a method for preventing the oxidation of red or pink pigments present in the surface of a freshly cut cured meat product.

A further object of the invention is to provide an improved method for the prevention of fading of cured meat color while at the same time reducing the shrinkage loss of the cured meat product.

Another object of the invention is to provide a method for packaging cured meat products for the retail market whereby such products remain attractive in appearance, and lose relatively little weight during storage and display.

A further object of the invention is to provide a novel method for packaging sliced or fresh-cut portions of cured meats to preserve the attractive appearance of the fresh-cut meat surfaces.

A still further object of the invention is to provide a novel cured meat package wherein at least one cut surface of the meat may be inspected by the buyer, and whereby such cut surface retains its attractive fresh-cut color and appearance for a substantial length of time.

These and further objects and advantages, which will become apparent from the ensuing description, are accomplished by the invention, which briefly, comprises: applying a gel-forming solution containing ascorbic acid, isoascorbic acid, or a water-soluble salt of one of these compounds, and a flexible transparent sheet or film of a material which is substantially impervious to air and moisture, to a fresh-cut cured meat surface so that the gel solution seals the transparent sheet or film to the fresh-cut surface and acts as an intermediate layer holding the ascorbic acid or isoascorbic acid compound directly in contact with the meat surface, where such compound can function as an antioxidant to preserve the meat pigments without itself becoming oxidized or otherwise destroyed by direct exposure to ambient conditions. The overlying sheet or film, in addition to protecting the ascorbic or isoascorbic acid-gel layer, provides the further function of preventing evaporation of moisture from the cut meat surface, thereby reducing shrinkage and weight losses. The thus-protected meat may then be overwrapped with a transparent wrapping material, such as cellophane, to provide an attractive meat package for market display.

For convenience of description, the gel solution containing ascorbic acid, isoascorbic acid, or a water-soluble salt of one of these acids, will be referred to, hereinafter, from time to time, merely as a gel-ascorbic acid solution.

One way in which the gel-ascorbic acid solution and air- and moisture-impervious sheet may be applied to the cut meat surface is by first applying the gel solution to one side of the impervious sheet, as by spraying, dipping, brushing, and the like, to provide a continuous gel coating or film thereover, and then pressing the coated sheet against the meat surface with the gel-ascorbic acid side in direct contact with the meat.

The gel-ascorbic acid solution may be applied to the transparent air-impermeable sheet in a relatively fluid state, and then allowed to solidify before the gel-coated sheet is applied to the meat surface. Thus, in the case of gel-forming solutions which set upon temperature reduction, for example, aqueous solutions of gelatin or the like, the solution may be applied at a temperature at which it is sufficiently liquid to be readily sprayed or brushed, and the impervious sheet material may be cooled to facilitate the setting or solidification of the solution. For example, the liquid gel-ascorbic acid solution may be sprayed upon one surface of the sheet material while the other surface of such material is in contact with a cold surface, such as the surface of a chilled block or roll. The gel solution instantly solidifies, and the coated sheet may be handled immediately. The thickness of the gel coating can be readily controlled, since the solidified gel will build up on continued spraying. The solidified gel, nevertheless, is sufficiently soft and flexible to enable it to fill the pores and crevices of the meat surface and to adhere to such surface, thereby excluding entrance of air and evaporation of moisture. When the impervious film or sheet is stripped from the meat surface, the gel coating usually remains with the sheet and is not left on the meat. It will be understood, however, that the gel-ascorbic acid film is edible and may remain on the meat without detriment. Other means for controlling the setting or solidification of the gel-ascorbic acid solution may be utilized, depending upon the gelation agents employed.

In another method of application, the gel-ascorbic acid solution may be applied to the fresh-cut meat surface by spraying, dipping, or brushing to provide a continuous gel film filling all of the surface pores and crevices of such surface and excluding air therefrom. Either prior to or after solidification of the gel film, the air- and moisture-impervious sheet, which preferably is precut to substantially the size of the cut meat surface, is superimposed upon the gel film and is pressed into contact with all portions of the film so that any entrapped air may escape. The gel film acts to bind the impervious sheet to the cut meat surface so that air is prevented by such sheet from contact either with the meat surface or gel film. Since moisture cannot escape from the gel or meat surface through the moisture-impervious sheet, the gel retains a relatively high water content and the meat surface does not dry out but retains its bright, fresh, moist appearance. Likewise, since the overlying sheet excludes air from contact with the ascorbic acid, this material retains its antioxidant properties for a relatively long period of time.

The coated meat product is then preferably overwrapped with a transparent covering to provide an attractive meat package through which the meat including the cut surface may be visually inspected. In this method of protecting the cut surface, the outer overwrapping does not have to be evacuated, nitrogen filled, or otherwise rendered air-free, nor does it have to be of material which is air-impervious.

A still further method comprises painting the fresh-cut surface of the meat, such as that of a half-ham, with the gel-ascorbic acid solution, then placing the treated meat in an air- and moisture-impervious transparent bag, evacuating the bag of air, sealing same and heat-shrinking it so that it clings tightly to the meat. By the air evacuation and heat shrinking of the bag, oxygen is effectively excluded from contact with the gel-ascorbic acid film. The need for a separate air- and moisture-impervious transparent sheet is thus eliminated, as well as the necessity for overwrapping with a transparent covering to provide an attractive meat package. After treating of the meat surface with the gel-ascorbic acid solution, packaging is accomplished in one operation by using an air- and moisture-impervious bag, say, of Cryovac (polymerization product of vinylidene chloride), followed by evacuation and shrinking of the bag.

It will be understood that some improvement in protection of the cut meat surface is obtained by treating the surface with a gel-ascorbic acid solution without further application of the overlying air- and moisture-impervious sheet. In this case, the gel-forming mixture solidifies on the cut surface of the meat, retaining the ascorbic acid directly on the surface. The gelatinous film affords some measure of protection of the meat surface from contact with air and of the ascorbic acid from oxidation. However, it has been found that the protective effect of the ascorbic acid-gel coating is vastly improved and rendered substantially complete by covering the cured meat surface with both the ascorbic acid gel film and transparent sheet or film which is substantially non-permeable to air and moisture. This film effectively protects the cured meat surface, as well as the ascorbic acid or ascorbic acid compound, from oxidation and, moreover, retards the evaporation of moisture from gel and meat. Since the object of the invention is to preserve the original cured meat color, rather than to convert oxidized pigments to a different color, the gel-ascorbic acid coating and impermeable covering must be applied substantially immediately to a fresh-cut surface of the meat, and when so applied retain the color of the original cut surface for a prolonged period of time, even though the cut is exposed to light and air as in the modern showcase.

The gel-forming solution may be prepared by the addition of such gelling agents as gelatin, agar, alginates, pectinates, and other edible hydrophilic colloids to a water solution of ascorbic acid. Usually about 2% to 10% of gelling agent and 1% to 10% of ascorbic acid, isoascorbic acid, sodium ascorbate, or sodium isoascorbate, will provide a satisfactory solution. However, the amount of gelling agent will depend somewhat upon the viscosity of the solution desired and upon the particular gelling agent used. A satisfactory solution is one which can be readily applied by spraying, dipping, or brushing methods, and which will form a thin, transparent, continuous film and solidify in a relatively short period of time. The pH of the gel-ascorbic acid solution may vary widely, and solutions having a pH in the range of from about 3.0 to 9.9 have been used with generally satisfactory results. It is preferred, however, to utilize solutions on the acid side of the pH range, since color stability appears to be slightly better with such solutions. It will be understood that where salts of ascorbic acid or isoascorbic acid are employed, a slightly greater quantity of the salts may be necessary than with the free acids to provide the same antioxidant effect. Other ingredients, including mold-inhibiting agents, flavoring agents, and the like, may be added to the gel-ascorbic acid solution if desired.

The meat surfaces treated by the foregoing methods may be any freshly sliced cured meat surface such as sliced ham, bologna, bacon, sausages, half portions of hams, and the like. The surface treatment is especially effective in the case of heat-treated, cooked, or smoked products, since the color pigments in such products are readily oxidized upon exposure to air and light.

While the entire surface of the meat piece may be covered by the gel-ascorbic acid solution, it is a feature of the invention that the cut surface only need by treated. Thus, in the case of a half ham, only the exposed fresh-cut surface is treated. In the case of a small package of stacked, sliced meat products, such as stacked slices of cooked cured ham, bologna, and other sandwich meats, only the top slice need be treated, since the remaining slices are protected by the treated top slice. The bottom of the stack of slices may be protected by an opaque backing material, as by a piece of cardboard, or, if desired, the backing material may be omitted and the bottom slice surface treated with gel-ascorbic acid solution in the same manner as the top slice.

The air- and moisture-impervious transparent sheet overlying the gel coating may be selected from any of a great number of commercially available non-toxic plasticious sheet materials, such as those of the polyethylene type, one of which is marketed under the trade name of "Visqueen," the polymerization products of vinylidene chloride such as those known as "Saran" and Cryovac," polyblends such as "Visten," and laminates of any such films such as the laminate of "cellophane" and polyethylene marketed as "Cellothene." Films of air-permeable material such as "cellophane" (regenerated cellulose) provide little protection and are generally unsatisfactory. However, "cellophane" or other relatively inexpensive transparent films may be utilized to provide an outside wrapper for a package protected with an air-impermeable sheet.

Figure 2:
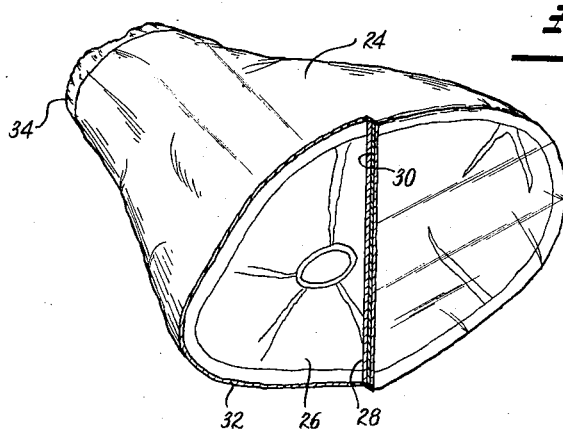

The invention will be further understood by reference to the accompanying drawings, in which:

Fig. 1 is a perspective view of a meat package containing a plurality of sliced and stacked meat products treated and wrapped in accordance with the principles of the present invention; and Fig. 2 is a perspective view of a half ham, the cut surface of which has been treated by the method of the present invention, and which has been overwrapped by a transparent film.

Referring now to Fig. 1 of the drawings, the novel meat package comprises a plurality of slices 10 which have been stacked upon an opaque backing material 12. The surface of the top slice 14 is provided with a gel-ascorbic acid film 16 over which a rectangle of transparent, air-impermeable material 18, such as "Cryovac" or "Saran" is superimposed. The whole package is provided with an overwrap 20 of transparent commercial wrapping material, such as "cellophane," which need not be airtight. The surface of the top slice 14 may thereby be directly inspected by visual observation through the transparent overwrap 20, transparent air-impermeable film 18, and transparent gel film 16. The sides of the sliced meat product, designated by the reference numeral 22, generally require no protection other than overwrap 20, since the packages are usually quite thin, and relatively small side areas are exposed. Moreover, a great variety of ways of treating the sides of meat products prior to slicing are employed in the art, which obviate the necessity for further protecting such surfaces. For example, products such as bologna, meat loaves, etc., are usually dipped in hot oil and are browned at the surface before slicing. Other products may employ commercial casings of known types, or may be at least partially protected by fat, as in the case of ham slices.

In Fig. 2 the novel meat product comprises a half ham 24, the cut surface 26 of which is provided with a gel-ascorbic acid film or coating 28, over which a disk of non-air-permeable material 30, such as "Cryovac" or "Saran," has been applied, following which a transparent overwrap 32 has been tightly drawn and secured in suitable manner at the hock end 34. The fresh, natural appearance of the cut surface 26 may be observed directly through the gel film 28, transparent disk 30, and overwrap 32.

Alternatively, in Fig. 2, the disk 30 may be eliminated and the overwrap 32 may be made of air- and moisture-impervious material such as "Cryovac" or "Saran," such overwrap being evacuated and heat-shrunk, as previously described.

The effectiveness of the combination of gel-ascorbic acid coating, air- and moisture-impermeable film, and overwrap is illustrated by the following examples:

*Example 1*

A solution was prepared by dissolving 5 grams of gelatine and 5 grams of ascorbic acid in 100 cubic centimeters of water. A second solution was prepared by dissolving 5 grams of ascorbic acid in 100 cubic centimeters of water with no gelatine added. A third solution was prepared by dissolving 5 grams of gelatine in 100 cubic centimeters of water, with no ascorbic acid added.

The top slice from one package-lot of sliced cooked ham was dipped in the solution of ascorbic acid and gelatine. The slice was then returned to the stack and the whole over-wrapped with transparent film ("cellophane") in the regular manner. The top slice from another package-lot of sliced cooked ham was dipped, as before, in the solution of ascorbic acid and gelatine. In this case, a rectangle of non-air-permeable transparent film ("Cryovac") was pressed into place over the treated surface of the slice. The slice was then returned to the stack and the whole, as before, overwrapped with "cellophane." The top slice from a third package-lot of cooked ham was dipped in the second solution containing only ascorbic acid and water. The slice was returned to the stack and the package was overwrapped with "cellophane." The top slice from a fourth package-lot of sliced cooked ham was dipped as before, in the second solution of ascorbic acid and water. A rectangle of "Cryovac" was then placed over the treated surface of the slice, and the slice was returned to the stack for overwrapping with "cellophane." A fifth test package was prepared, in which the top slice received no treatment other than being covered with a rectangle of "Cryovac" prior to overwrapping with "cellophane." The top slice from a sixth package-lot of sliced cooked ham was dipped in the third solution containing only gelatine and water. The slice was returned to the stack and the package was overwrapped with "cellophane." The top slice from a seventh package-lot of sliced cooked ham was dipped, as above, in the third solution of gelatine and water. In this case, a rectangle of "Cryovac" was added to the surface of the exposed slice before overwrapping with "cellophane." The eighth test package was prepared by directly overwrapping the stack with "cellophane" in the manner normally employed in the packaging of this product.

The eight packages, transparent side up, were exposed to direct fluorescent light for a period of 120 hours. Within three hours, the package with no surface treatment, the packages with gelatine-water treatment, with and without the "Cryovac" film, and the package without surface treatment other than the insertion of "Cryovac" film, were all badly faded. After 20 hours, the package with ascorbic acid-water treatment only was quite badly faded. The package with ascorbic acid-water plus "Cryovac" film showed much less fading. The packages with ascorbic acid-gelatine, with and without "Cryovac" film, showed practically no fading. At the end of 120 hours of continuous exposure to the fluorescent lights, all samples were faded with the single exception of the package whose surface slice was treated with ascorbic acid-gelatine, with "Cryovac" insert added.

This test and subsequent tests of the same type have shown that the protection afforded by the combination of gel-ascorbic acid and superimposed impermeable film is practically complete, and that full surface color is retained for the storage life of the product, even under conditions of continuous exposure to light. It has further been found that the ascorbic acid-gelatine layer affords bacteriological protection to the meat, and that spoilage is retarded to a marked degree in the treated packages. It has also been found that the process reduces weight loss or shrinkage on storage, apparently due to the fact that the "Cryovac" film is non-permeable to moisture as well as to air. Even though the treatment is applied to the top slice only, its effect is apparent in the underneath slices as well. While the outside slice in untreated packages fades most rapidly and to the greatest degree, fading also gradually extends to the lower slices. This does not occur in packages treated as described above.

*Example II*

The tests described in Example I were repeated using 2 grams of agar in place of the 5 grams of gelatine.

The results obtained were entirely similar to those described above.

*Example III*

The tests described in Examples I and II were repeated, except that the solutions were sprayed on the top surface of the top slice instead of dipping the slice.

The results again were entirely similar to those obtained previously.

*Example IV*

A smoked, cooked ham was obtained and sliced in half. One half was overwrapped directly with "cellophane." The surface of the second half was sprayed with a solution containing 5 grams of ascorbic acid and 5 grams of gelatine in 100 cubic centimeters of water. A disk of "Cryovac" film was placed over the treated surface, then the whole was overwrapped with "cellophane." The two halves were exposed to light under conditions comparable to those present in refrigerated display cases. Within 2 hours the untreated surface had faded noticeably; within 8 hours it was very badly faded and could not be sold without trimming and repackaging. After 168 hours, the treated half showed no trace of fading whatsoever.

*Example V*

Six test solutions were prepared, each containing 5 grams of gelatine per 100 cubic centimeters of water. No ascorbic acid was added to the first solution. 1 gram of ascorbic acid was added to the second, 2 grams to the third, 3 grams to the fourth, 4 grams to the fifth, and 5 grams to the sixth. The top slice of one package lot of sliced cooked bologna was sprayed with the gelatine-water solution. A rectangle of "Cryovac" was added to cover the treated surface and the whole was overwrapped with "cellophane." The process was repeated with each of the five remaining solutions. After 120 hours exposure to light, the six packages were graduated evenly as regards to the degree of fading, from complete fading in the gelatine-water sample to complete protection in the 5% ascorbic acid-gelatine sample.

*Example VI*

A rectangle of "Cryovac" was placed on a refrigerated metal block and sprayed with a solution containing 5 grams of ascorbic acid and 5 grams of gelatine per 100 cubic centimeters of water. The treated film was then pressed over the surface of the top slice of a package-lot of cooked ham, and the whole overwrapped with "cellophane." A similar control package was prepared using untreated "Cryovac." After 120 hours exposure to light the control package was badly faded, whereas only slight fading had occurred in the test package.

*Example VII*

The top slices from seven package-lots of sliced cooked bologna were sprayed with a solution containing 5 grams of ascorbic acid and 5 grams of gelatine per 100 cubic centimeters of water. Rectangles of available commercial films, including "Pliofilm," "Saran," "Cryovac," "Cellothene," "Visten," "Visqueen," and "cellophane" were pressed over their respective treated slices. The packages were individually overwrapped with "cellophane" and then exposed to fluorescent light for 48 hours. Protection was complete in the packages employing "Cryovac," "Saran," "Cellothene" and "Visten" films and was satisfactory in those employing "Pliofilm" and "Visqueen." The package employing a "cellophane" rectangle was the most badly faded, clearly illustrating the importance of air-impermeability of the overlying film.

*Example VIII*

The following test illustrates the reduction in shrinkage and weight loss of the packaged product on storage. Six-ounce packages of sliced, cooked ham were used in this test. The control packages were prepared in the regular protection manner, using the standard cardboard backing with "cellophane" overwrap. The test packages were prepared similarly, except the top slice of each was sprayed with gelatine-ascorbic acid solution, and were then immediately covered with rectangles of "Cryovac" film prior to overwrapping with "cellophane."

The shrinkage was determined on the two lots of product after 24 and 112 hours storage at 45° F.

| No. | Package | Percent Shrinkage After 24 hours at 45° F. | Percent Shrinkage After 112 hours at 45° F. |
|---|---|---|---|
| 1 | Control | 0.71 | 2.4 |
| 2 | do | 0.90 | 2.1 |
| 3 | do | 0.71 | 2.3 |
| 4 | do | 0.67 | 2.1 |
| 5 | do | 0.69 | 2.3 |
| Average | do | 0.69 | 2.2 |
| 1 | Test | 0.26 | 0.71 |
| 2 | do | 0.14 | 0.45 |
| 3 | do | 0.18 | 0.60 |
| 4 | do | 0.25 | 0.68 |
| 5 | do | 0.30 | 0.62 |
| Average | do | 0.21 | 0.61 |

The shrinkage tests show the treated products to have less than one-third as much shrinkage loss as the untreated products, and illustrate still another advantage of the use of the novel packaging methods and superiority of the resulting packaged meat product over the standard commercial product.

*Example IX*

A smoked, cooked ham was obtained and sliced in half. One half was overwrapped directly with "cellophane." The surface of the second half was painted with a solution containing 5 grams of isoascorbic acid and 5 grams of gelatine in 100 cubic centimeters of water. A disk of "Saran" film was placed over the treated surface, then the whole was overwrapped with "cellophane." The two halves were exposed to light under conditions comparable to those present in refrigerated display cases. Within two hours the untreated surface had faded noticeably and within 8 hours relatively severe fading had occurred. After 7 days of continuous exposure, the treated half showed no trace of fading whatsoever.

*Example X*

The test described in Example IX was repeated, except that the cut surface of a second half ham was painted with a solution containing 6.1 grams of sodium isoascorbate and 5 grams of gelatine in 100 cubic centimeters of water. Once again, the half ham without surface treatment faded rapidly, whereas the treated half showed no fading after 7 days of continuous exposure to display lighting.

*Example XI*

One test solution was prepared containing 5 grams of ascorbic acid and 10 grams of gelatine in 100 cubic centimeters of water. A second test solution was prepared containing 5 grams of isoascorbic acid and 10 grams of gelatine in 100 cubic centimeters of water. A third test solution was prepared containing 5.6 grams of sodium ascorbate and 10 grams of gelatine in 100 cubic centimeters of water. A fourth test solution was prepared containing 6.1 grams of sodium isoascorbate and 10 grams of gelatine in 100 cubic centimeters of water.

Four smoked, cured picnic hams were obtained and sliced in half. One-half of each was placed in a "Cryovac" bag, then the bag was evacuated, sealed, and heat shrunk in hot water. The cut surface of each of the four remaining halves was painted with one of the above solutions. The treated halves were then placed in "Cryovac" bags and the bags air-evacuated, sealed, and heat shrunk as with the untreated halves.

All test samples were exposed to light under conditions comparable to those present in refrigerated display cases. The half picnics packaged in "Cryovac" but without surface treatment showed noticeable fading after 7 hours of continuous exposure to light. The corresponding half picnics, treated with the antioxidant-gelatine solutions showed no fading after 7 days of continuous exposure.

It will be seen from the foregoing examples that both ascorbic acid and isoascorbic acid per se, as well as the water-soluble salts thereof, are effective antioxidants when used in the manner described. Other antioxidants may be used, but, in general, have not been found to be as effective.

While improvements in prevention of color fading of the cured meat surfaces are obtained by the application of ascorbic acid-gel solutions alone to the meat surfaces, and by application of ascorbic acid solution and air- and moisture impervious film combinations to such surfaces, it will be seen that by far the greatest improvement is obtained by utilizing a combination of ascorbic acid-gel solution and air- and moisture-impervious film in the manner described.

This application is a continuation-in-part of our application Serial Number 551,856, filed December 8, 1955, now abandoned.

We claim:

1. The process of preserving the color of a fresh-cut cured meat surface, comprising: covering said fresh-cut surface with a gel layer containing from about 2 to 10% of an edible hydrophilic colloid and from about 1 to 10% of an antioxidant compound selected from the group consisting of ascorbic acid, isoascorbic acid and the water-soluble salts of said acids, and with a layer of transparent, substantially air-impervious plastic material over said gel layer and in substantially continuous contact with said gel layer to thereby prevent access of air to said meat surface and to said antioxidant compound.

2. The process of claim 1 wherein a fluid aqueous gel-forming solution containing said edible hydrophilic colloid and antioxidant compound is applied to the fresh-cut cured meat surface to form said gel layer and said air-impervious material is pressed upon said gel layer and is retained upon the surface of the meat by adherence to said gel layer.

3. The process of claim 1 wherein said gel layer containing said edible hydrophilic colloid and an antioxidant is a solidified aqueous solution of gelatin containing said antioxidant.

4. The process of claim 1 wherein said meat surface is a fresh-cut surface of a cured and cooked pork product.

5. The process of claim 1 wherein said meat surface is a surface of a cured and smoked pork product.

6. The process of preserving the color of a fresh-cut surface of a cured meat product, comprising: applying a gel-forming solution containing from about 2 to 10% of gelatin and from about 1 to 10% of an antioxidant selected from the group consisting of ascorbic acid, isoascorbic acid and the water-soluble salts of said acids to the surface of an air-impermeable, transparent plastic sheet to form a continuous coating; permitting said solution to solidify to a gel; and pressing said gel-coated sheet material against said cured meat surface with said gel coating in direct contact with the meat surface.

7. The process of claim 6 wherein said air-impermeable sheet is chilled to facilitate solidification of said gel solution.

8. The process of preserving the color of a fresh-cut surface of a heat-treated cured meat product, comprising: covering said fresh-cut surface with a gel layer containing from about 2 to 10% of gelatin and from about 1 to 10% of an antioxidant compound selected from the group consisting of ascorbic acid, isoascorbic acid, and the water-soluble salts of said acids, and with a layer of transparent, substantially air-impervious plastic material over said gel layer and in substantially continuous contact with said gel layer to thereby prevent access of air to said meat surface and to said antioxidant compound, and over-wrapping said cured meat product with a transparent wrapping material.

9. In a process of preparing relatively small cuts of a cured meat product for market display, the steps comprising: covering at least one exposed cut surface of said meat product with a gel layer containing from about 2 to 10% of gelatin and from about 1 to 10% of an antioxidant compound selected from the group consisting of ascorbic acid, isoascorbic acid, and the water-soluble salts of said acids, and with a layer of substantially air- and moisture-impervious transparent plastic material over said gel layer, and overwrapping the so-treated product with a transparent wrapping material.

10. In a process of preparing cured meat for market display, the steps comprising: cutting said meat into slices, stacking said slices, covering at least one exposed surface of the stacked slices with a gel layer containing from about 2 to 10% of gelatin and from about 1 to 10% of an antioxidant compound selected from the group consisting of ascorbic acid, isoascorbic acid, and the water-soluble salts of said acids, and with a layer of substantially air- and moisture-impervious transparent plastic material, and overwrapping the resultant product with a transparent wrapping material.

11. The process of preserving the color of a fresh-cut cured meat surface, comprising: applying a gel-forming solution containing from about 2 to 10% of gelatin and from about 1 to 10% of an antioxidant compound selected from the group consisting of ascorbic acid, isoascorbic acid and the water-soluble salts of said acids to said fresh-cut surface to provide a thin, continuous gel film over said surface, placing the so-treated product in a transparent air- and moisture-impervious flexible plastic bag, evacuating said bag, sealing said bag, and heat shrinking said sealed bag into close contact with said treated product.

12. A meat package adapted for retail display, comprising: a portion of cured meat having at least one cut surface, a gel layer containing from about 2 to 10% of gelatin and from about 1 to 10% of an antioxidant compound selected from the group consisting of ascorbic acid, isoascorbic acid and the water-soluble salts of said acids in continuous direct contact with said cut surface, a substantially air- and moisture-impervious transparent film overlying said gel layer and in continuous contact therewith, and an overwrapping of transparent plastic material around the resulting product.

13. A meat package adapted for retail display, comprising: a stack of cured meat slices, an opaque layer covering the bottom of said stack of slices, a gel layer containing from about 2 to 10% of gelatin and from about 1 to 10% of an antioxidant compound selected from the group consisting of ascorbic acid, isoascorbic acid and the water-soluble salts of said acids in continuous direct contact with the top surface of said stack, a substantially air- and moisture-impervious transparent plastic film overlying said gel layer and in continuous contact therewith, and a transparent overwrap around the resulting product.

References Cited in the file of this patent

UNITED STATES PATENTS

| | | |
|---|---|---|
| 2,462,760 | Mitchell et al. | Feb. 22, 1949 |
| 2,470,281 | Allingham | May 17, 1949 |
| 2,567,085 | Stoloff | Sept. 4, 1951 |
| 2,611,708 | Owens et al. | Sept. 23, 1952 |
| 2,785,075 | Malecki | Mar. 12, 1957 |

OTHER REFERENCES

"Modern Packaging," January 1948, pp. 125, 126 and 127, article entitled Discoloration of Packaged Red Meat.

"Refrigerating Engineering," February 1954, p. 46, article entitled Packaging and Wrapping Materials.